(12) United States Patent
Gam et al.

(10) Patent No.: US 12,103,444 B2
(45) Date of Patent: Oct. 1, 2024

(54) SEAT ASSEMBLY

(71) Applicant: Lear Corporation, Southfield, MI (US)

(72) Inventors: Wee Gam, Troy, MI (US); Anthony Mollica, Royal Oak, MI (US); Paul Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 311 days.

(21) Appl. No.: 17/549,025

(22) Filed: Dec. 13, 2021

(65) Prior Publication Data
US 2022/0227268 A1 Jul. 21, 2022

Related U.S. Application Data

(60) Provisional application No. 63/139,455, filed on Jan. 20, 2021.

(51) Int. Cl.
*B60N 2/30* (2006.01)

(52) U.S. Cl.
CPC ........... *B60N 2/309* (2013.01); *B60N 2/3093* (2013.01)

(58) Field of Classification Search
CPC ................. B60N 2/309; B60N 2/3093; B60N 2002/899; B60N 2/305; B60N 2/2209; B60N 2/005; B60N 2/0284; B60N 2/22; B60N 2/12; B60N 2/3029
See application file for complete search history.

(56) References Cited

U.S. PATENT DOCUMENTS

| | | | |
|---|---|---|---|
| 1,761,673 A | 6/1930 | Lauris | |
| 3,572,826 A | 3/1971 | Barnes | |
| 4,971,380 A | 11/1990 | Cote et al. | |
| 7,510,228 B2 | 3/2009 | Ito | |
| 7,568,764 B2 | 8/2009 | Harper et al. | |
| 7,611,200 B2 | 11/2009 | Jovicevic et al. | |
| 9,308,836 B2 | 4/2016 | Hausler et al. | |
| 9,358,906 B2 | 6/2016 | Taylor et al. | |
| 9,446,849 B1 | 9/2016 | Pinkal | |
| 9,573,490 B1 | 2/2017 | Poniatowski et al. | |
| 9,669,735 B2 | 6/2017 | Singla Casasayas | |
| 9,827,882 B2 | 11/2017 | Jeong et al. | |
| 10,065,536 B2 | 9/2018 | Poniatowski et al. | |

(Continued)

FOREIGN PATENT DOCUMENTS

| | | |
|---|---|---|
| CN | 203372094 U | 1/2014 |
| CN | 104709121 A | 6/2015 |

(Continued)

OTHER PUBLICATIONS

Chinese Search Report dated Aug. 8, 2023 for CN202210033221.3 (w_machine translation).

(Continued)

*Primary Examiner* — Amy R Weisberg
*Assistant Examiner* — Sara Laghlam
(74) *Attorney, Agent, or Firm* — Fishman Stewart PLLC

(57) ABSTRACT

A seat assembly may include a seat support configured to be fixed to a first mounting portion of a mounting surface; a seatback frame having an upper portion and a lower portion; a seat base including a seat base frame rotationally connected to the seat support, and a track movably connected to the seat base frame; and a linkage connecting the lower portion of the seatback frame with the track. The upper portion of the back frame may be configured to be rotationally connected to a second mounting portion of said mounting surface.

20 Claims, 14 Drawing Sheets

(56) References Cited

U.S. PATENT DOCUMENTS

| | | |
|---|---|---|
| 10,464,679 B2 | 11/2019 | Hoover |
| 2013/0049425 A1 | 2/2013 | Runde et al. |
| 2013/0093218 A1 | 4/2013 | Yetukuri |
| 2014/0001809 A1 | 1/2014 | Line |
| 2015/0108804 A1 | 4/2015 | Meister |
| 2015/0165935 A1 | 6/2015 | Sachs et al. |
| 2018/0244176 A1 | 8/2018 | Matsui |
| 2019/0168644 A1 | 6/2019 | Kim |
| 2020/0055428 A1 | 2/2020 | Kakishima |
| 2020/0115058 A1 | 4/2020 | Hoover |
| 2020/0262561 A1 | 8/2020 | Verny |

FOREIGN PATENT DOCUMENTS

| | | |
|---|---|---|
| CN | 105683042 A | 6/2016 |
| CN | 108025662 A | 5/2018 |
| CN | 109878385 A | 6/2019 |
| CN | 110843617 A | 2/2020 |
| CN | 111038704 A | 4/2020 |
| DE | 10200401433 A1 | 10/2005 |
| EP | 3640136 A1 | 4/2020 |
| GB | 2563051 A | 12/2018 |

OTHER PUBLICATIONS

Chinese Office Action dated Aug. 12, 2023 for CN202210033221.3 (w_machine translation).
German Office Action dated Mar. 7, 2023 for DE102022100276.4. (8 pages).
Chinese Office Action dated Apr. 11, 2024 for CN202210033221.3 (w_machine translation).
Chinese Office Action and Search Report dated Jun. 28, 2024 for CN202210033221.3 (w_machine translation).

SEAT ASSEMBLY

CROSS-REFERENCE TO RELATED APPLICATION

This application claims the benefit of U.S. Provisional Patent Application Ser. No. 63/139,455, filed on Jan. 20, 2021, the disclosure of which is hereby incorporated by reference in its entirety as though fully set forth herein.

TECHNICAL FIELD

The present disclosure generally relates seat assemblies, including seat assemblies that may, for example, be utilized in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat designs may not provide sufficient functionality. For example and without limitation, some seat designs may not be configured to flip up into a storage position at a plurality of seatback frame angles without a significant risk of jamming a sliding connection or a sliding connection damaging a nearby component.

There is a desire for solutions/options that minimize or eliminate one or more challenges or shortcomings of seat assemblies. The foregoing discussion is intended only to illustrate examples of the present field and is not a disavowal of scope.

SUMMARY

In embodiments, a seat assembly may include a seat support configured to be fixed to a first mounting portion of a mounting surface; a seatback frame including an upper portion and a lower portion; a seat base including a seat base frame rotationally connected to the seat support, and a track movably connected to the seat base frame; and a linkage connecting the lower portion of the seatback frame with the track. The upper portion of the back frame may be configured to be rotationally connected to a second mounting portion of said mounting surface.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1A:
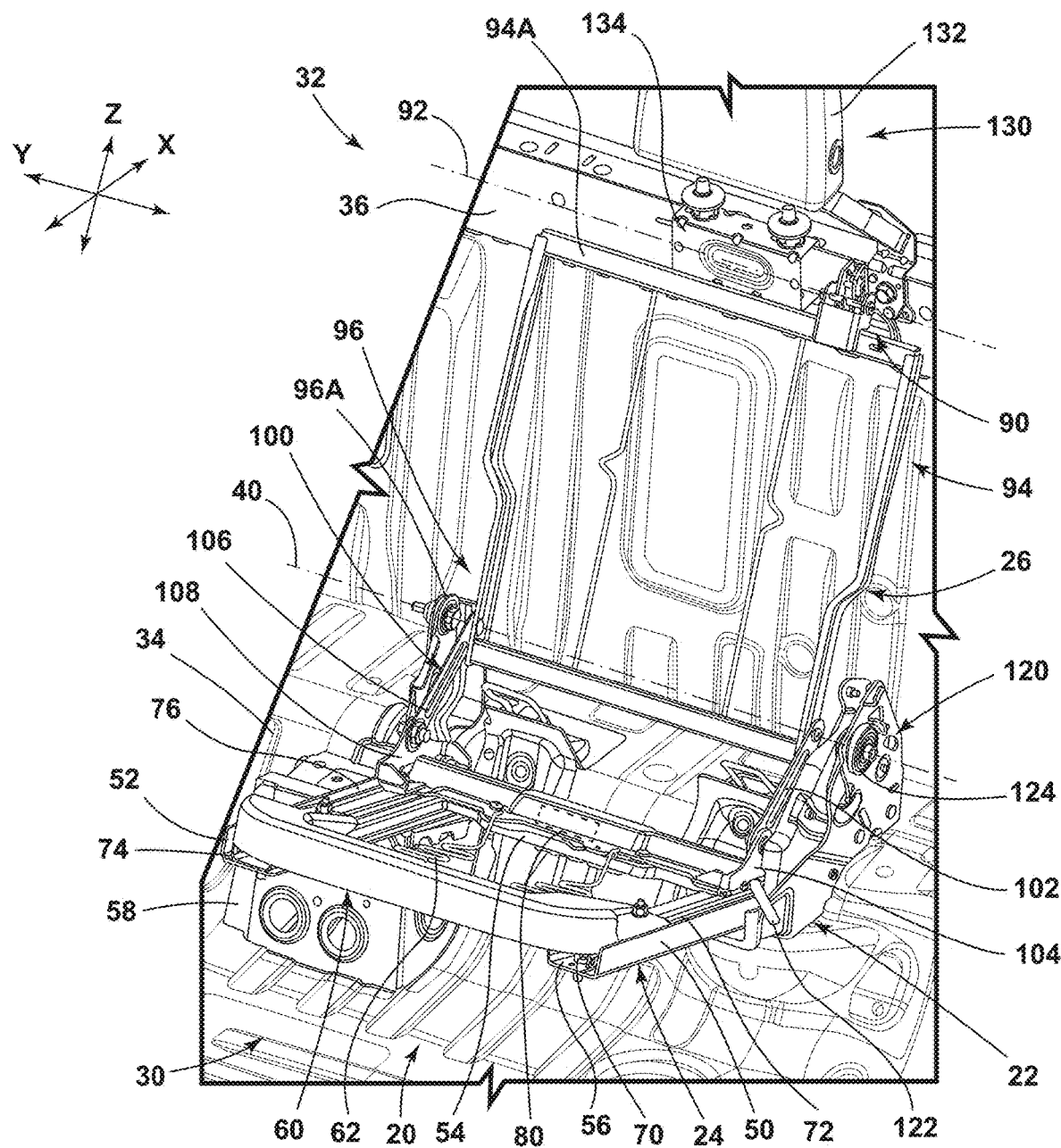
FIG. 1A is a perspective view generally illustrating an embodiment of a seat assembly in a first seating position.
Figure 1B:
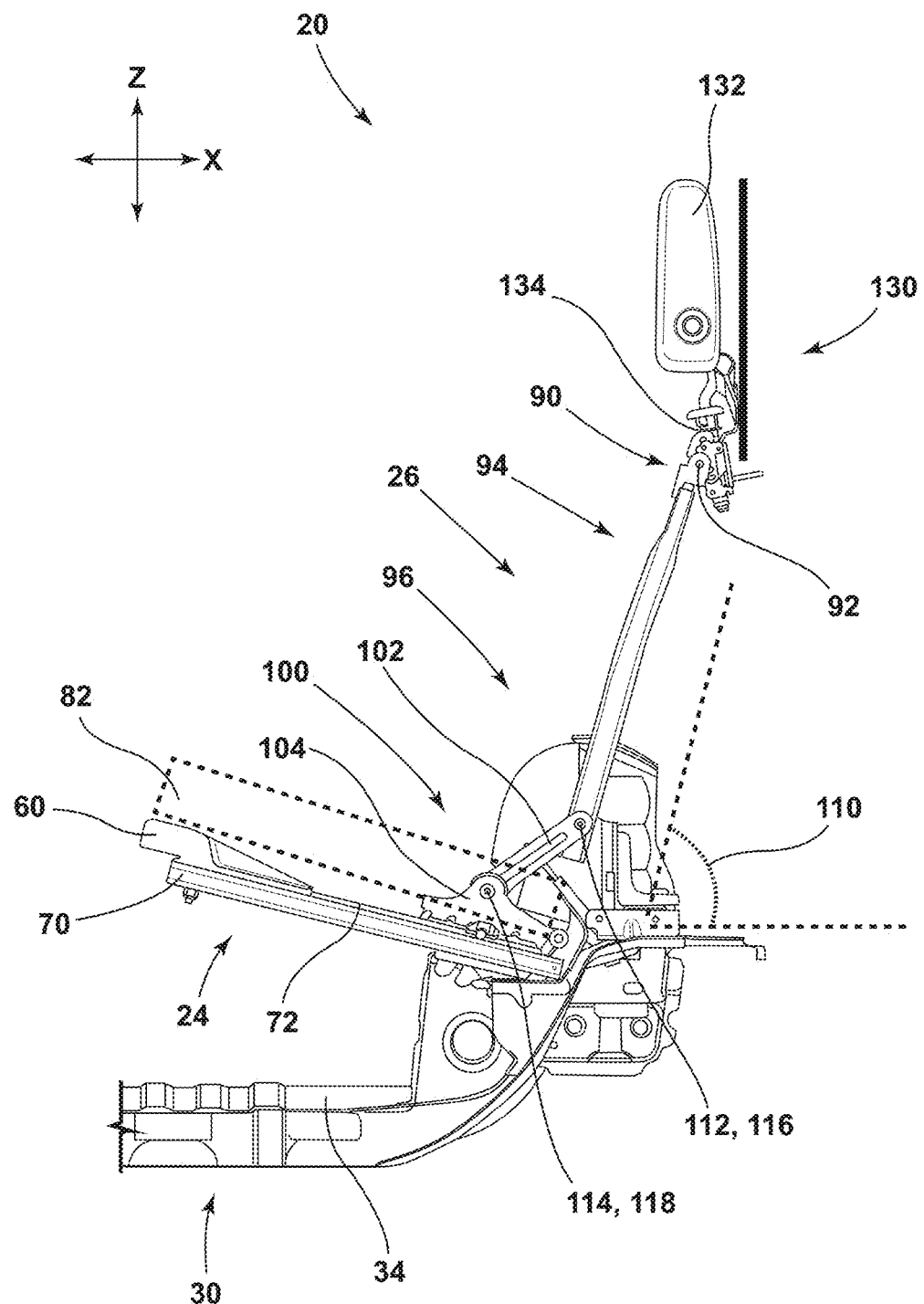
FIGS. 1B and 1C are side views generally illustrating an embodiment of a seat assembly a first seating configuration.
Figure 1C:
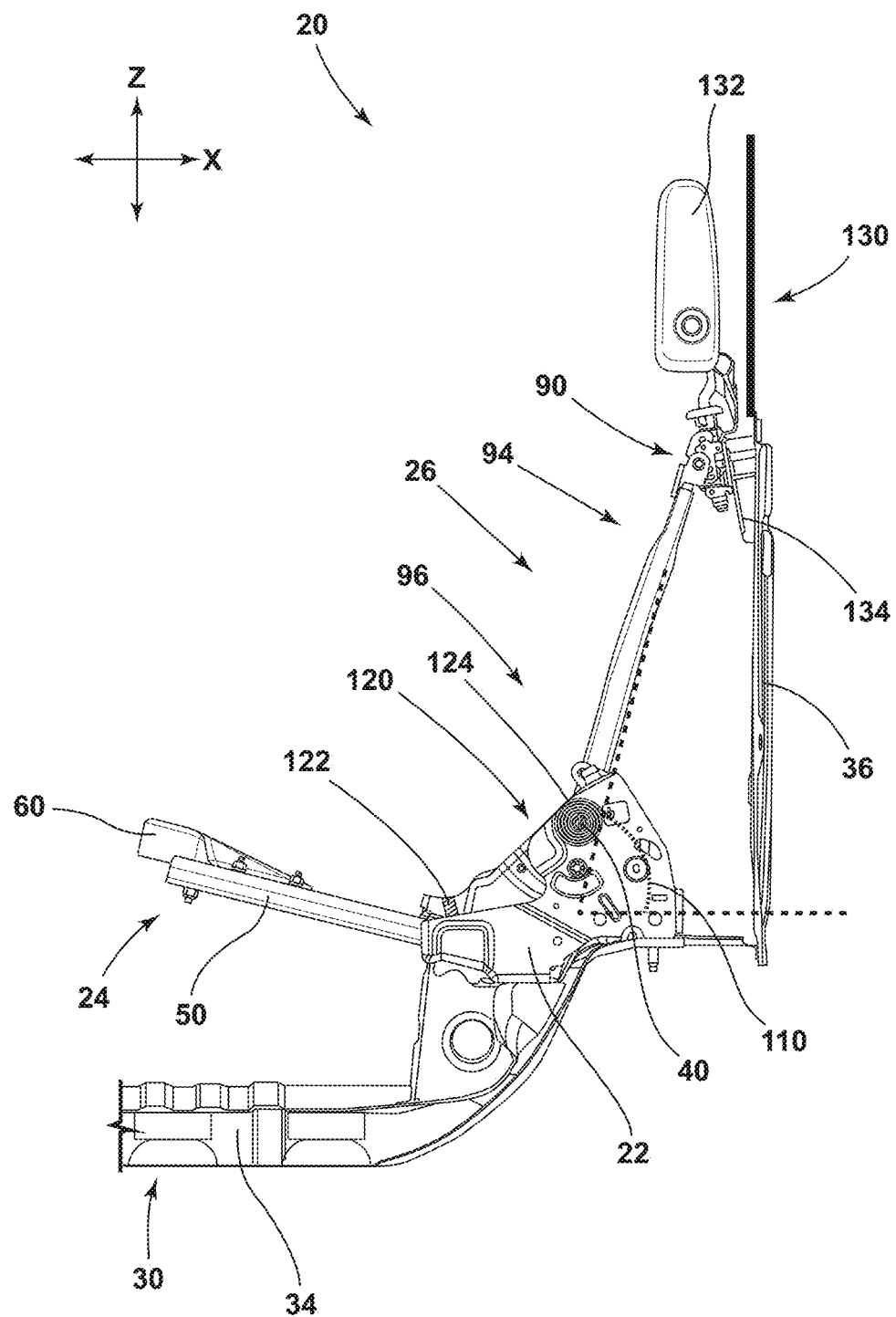
Figure 1D:
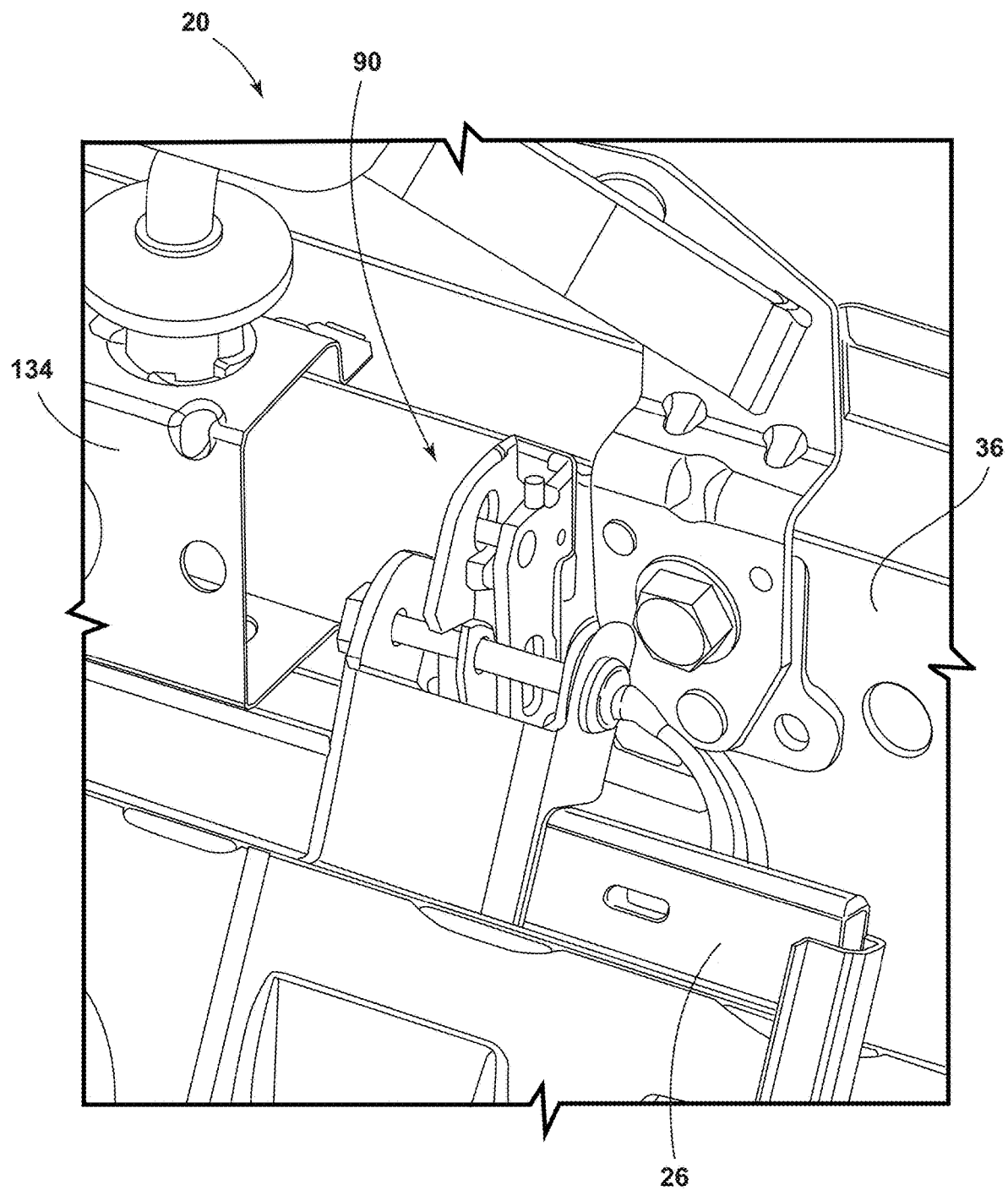
FIG. 1D is a partial perspective view generally illustrating an embodiment of a seat assembly.
Figure 2A:
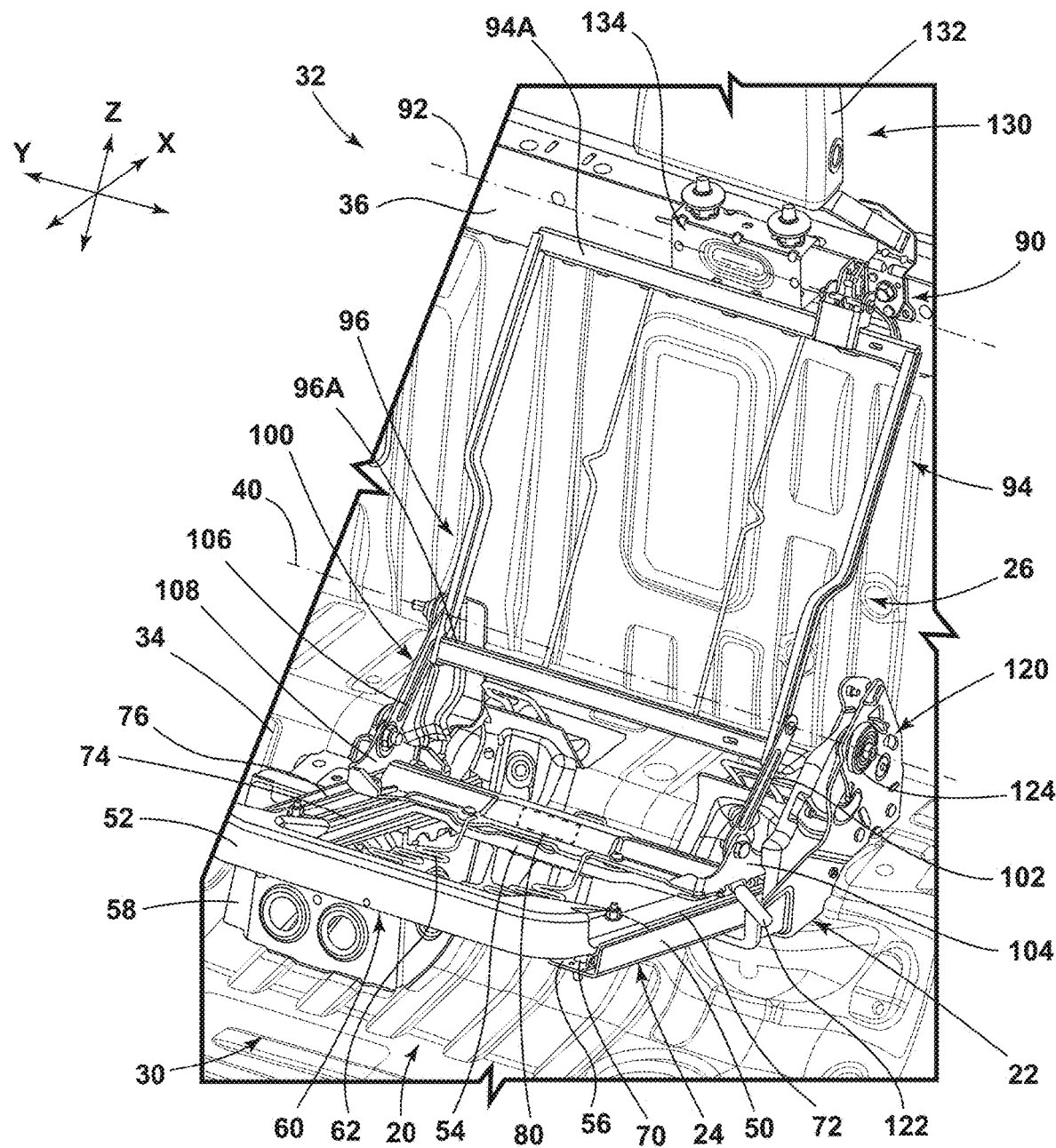
FIGS. 2A and 2B are perspective and side views, respectively, generally illustrating an embodiment of a seat assembly in a second seating configuration.
Figure 2B:
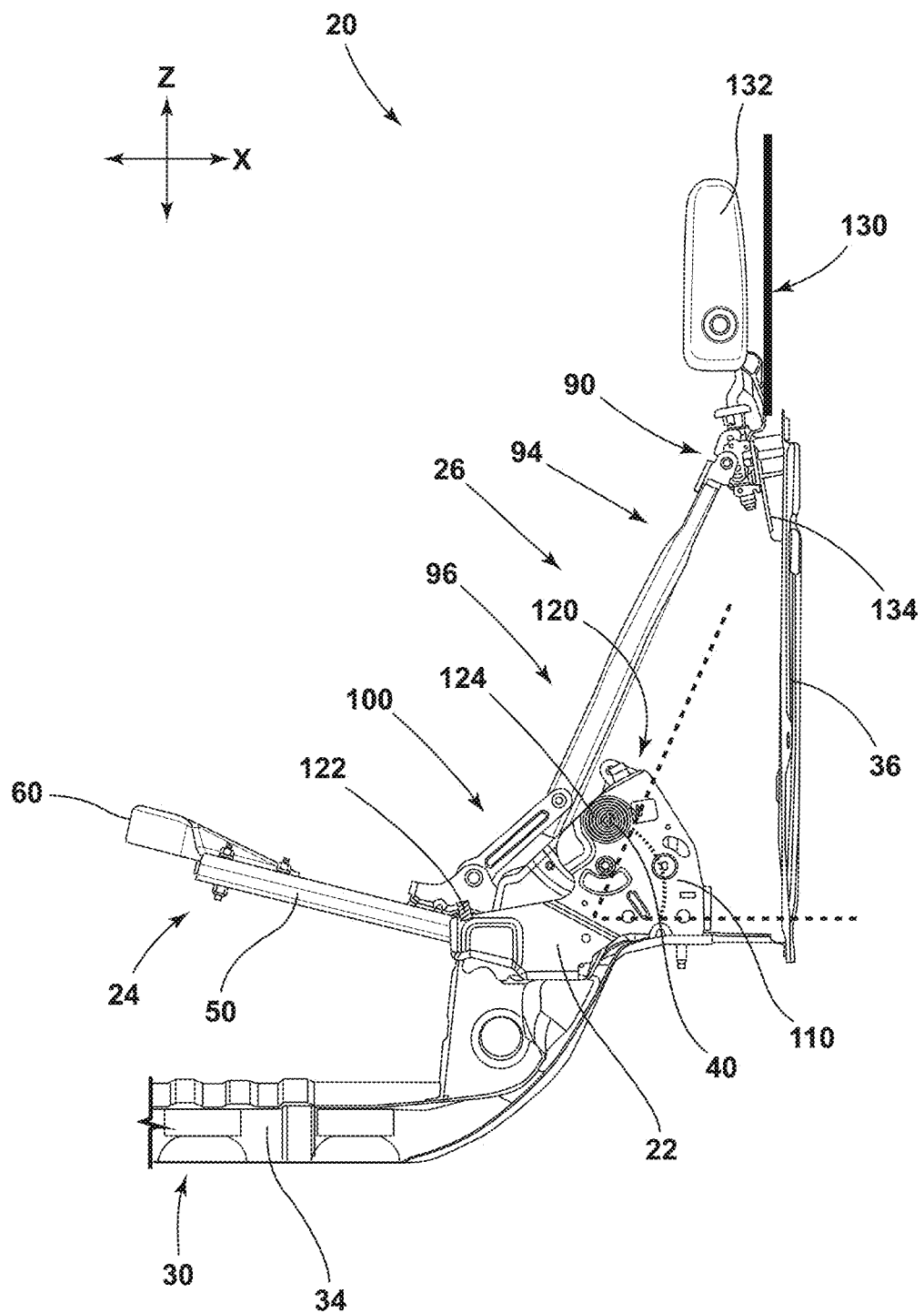

In embodiments, such as generally illustrated in FIGS. 1A, 1B, and 1C, a seat assembly 20 may include a seat support 22, a seat base frame 24, and/or a seatback frame 26. The seat assembly 20 may be connected to a mounting surface 30, which may include one or more portions of a vehicle 32. For example and without limitation, a first mounting portion 34 of the mounting surface 30 may include a vehicle floor, and/or a second mounting portion 36 of the mounting surface 30 may include a wall (e.g., a substantially vertical rear wall) of a vehicle 32. A vehicle 32 may, for example, include a pickup truck. A seat assembly 20 may, for example, be disposed in a rear of a vehicle 32, such as in the rear of a pickup truck cab, and may be rotationally fixed to a second mounting portion 36 (e.g., a rear wall of the pickup truck cab).

Figure 4A:
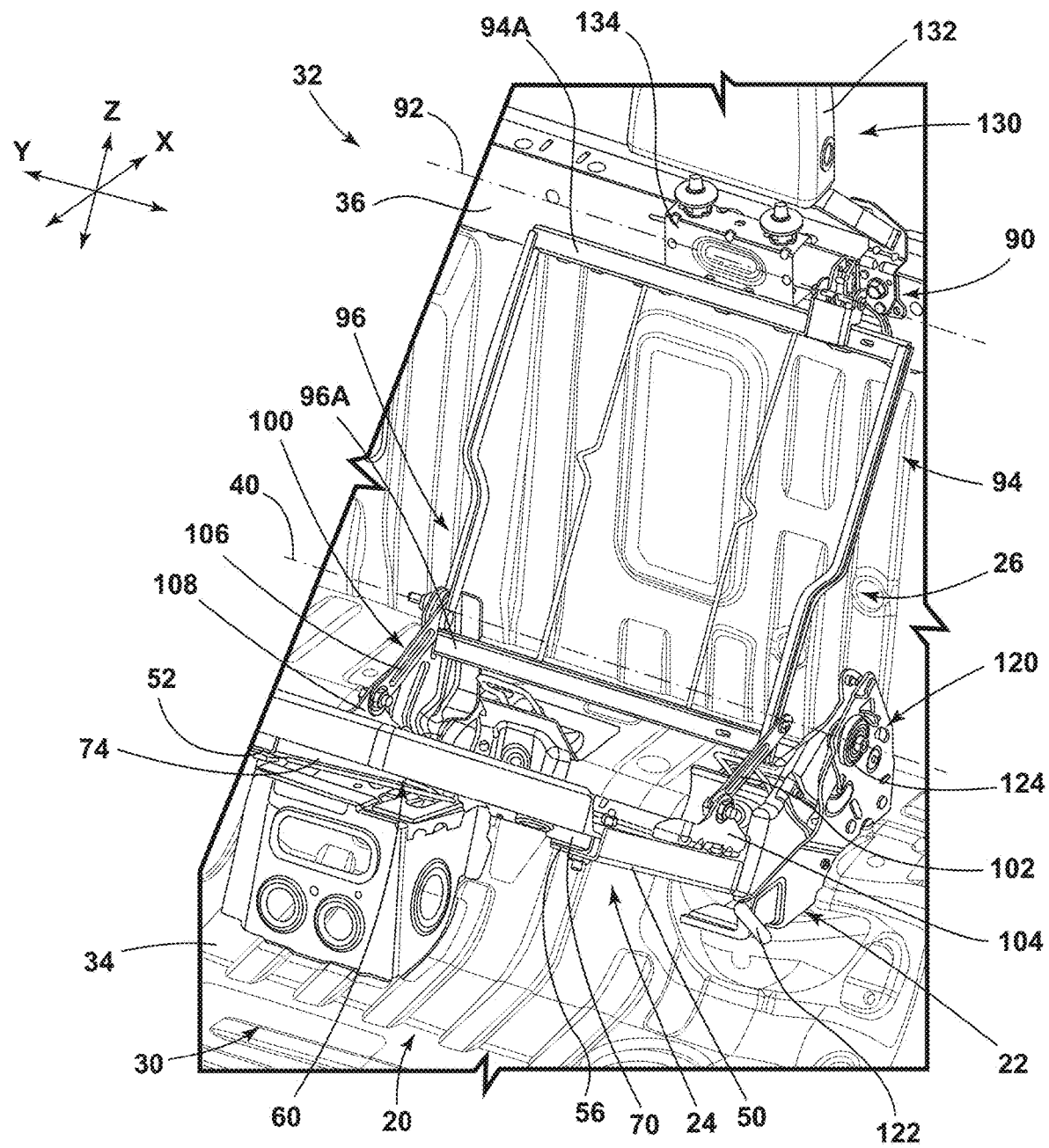
FIGS. 4A and 4B are perspective and side views, respectively, generally illustrating an embodiment of a seat assembly in an intermediate configuration.
Figure 4B:
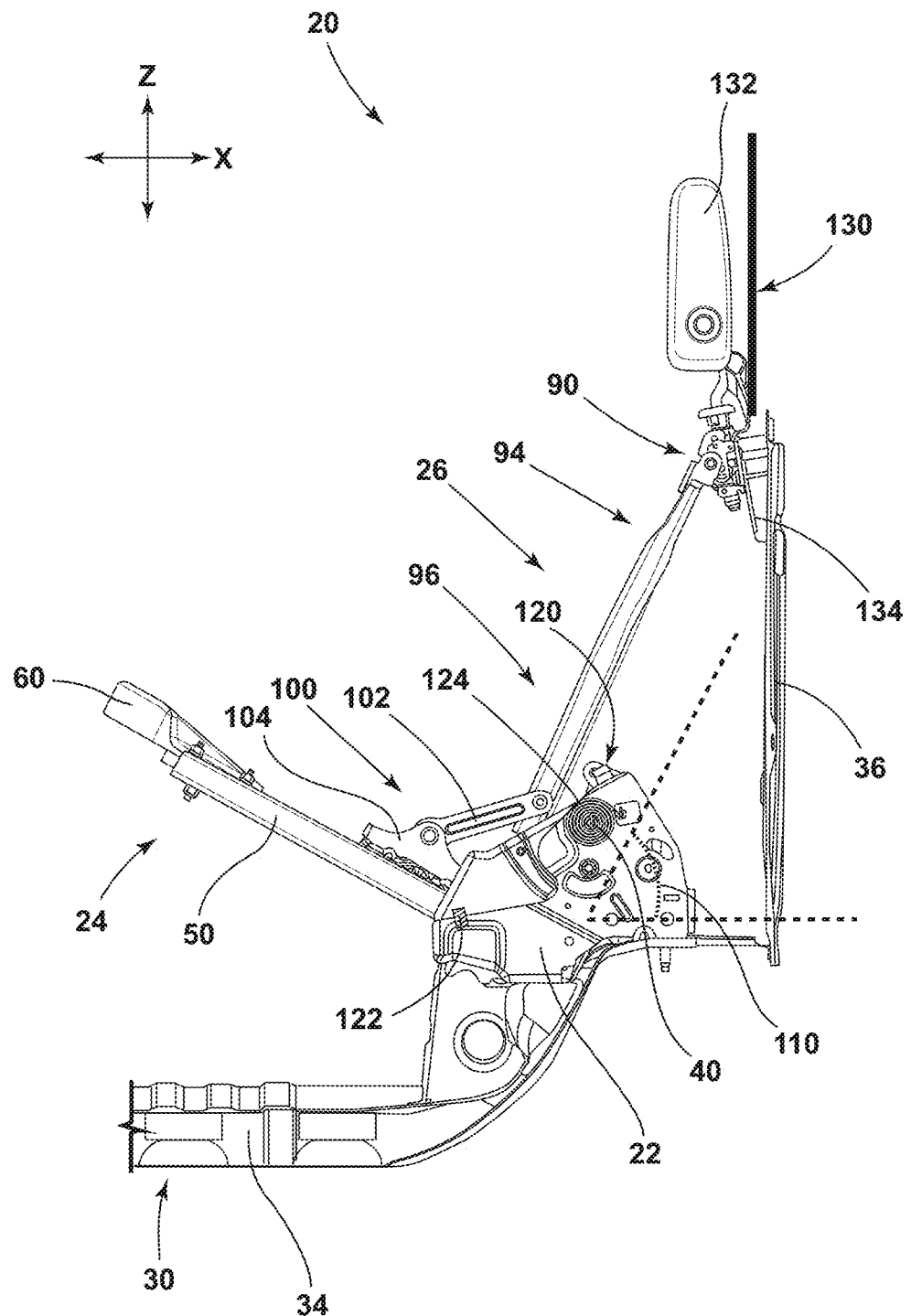
Figure 5A:
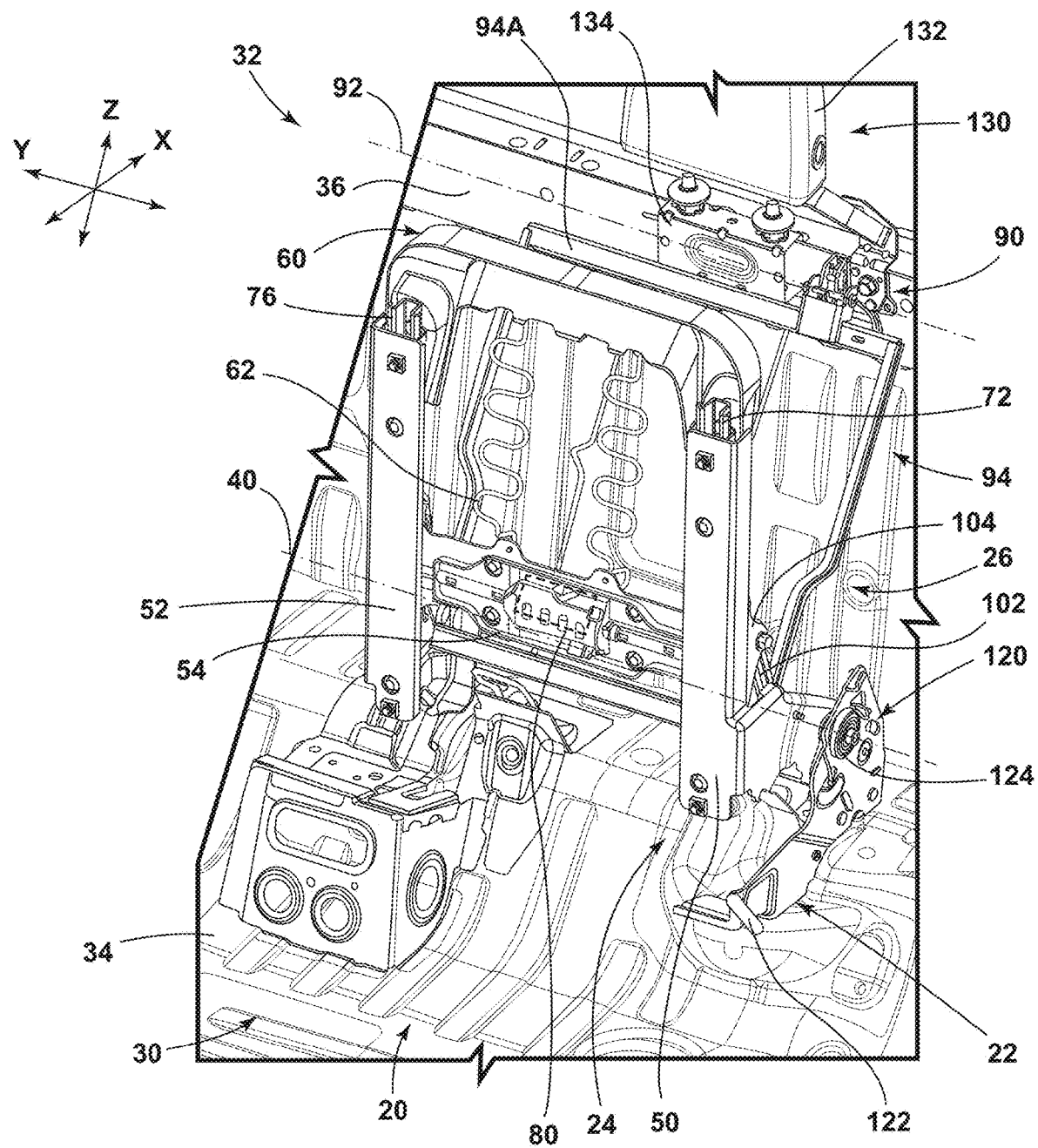
FIGS. 5A and 5B are perspective and side views, respectively, generally illustrating an embodiment of a seat assembly in a storage configuration.
Figure 5B:
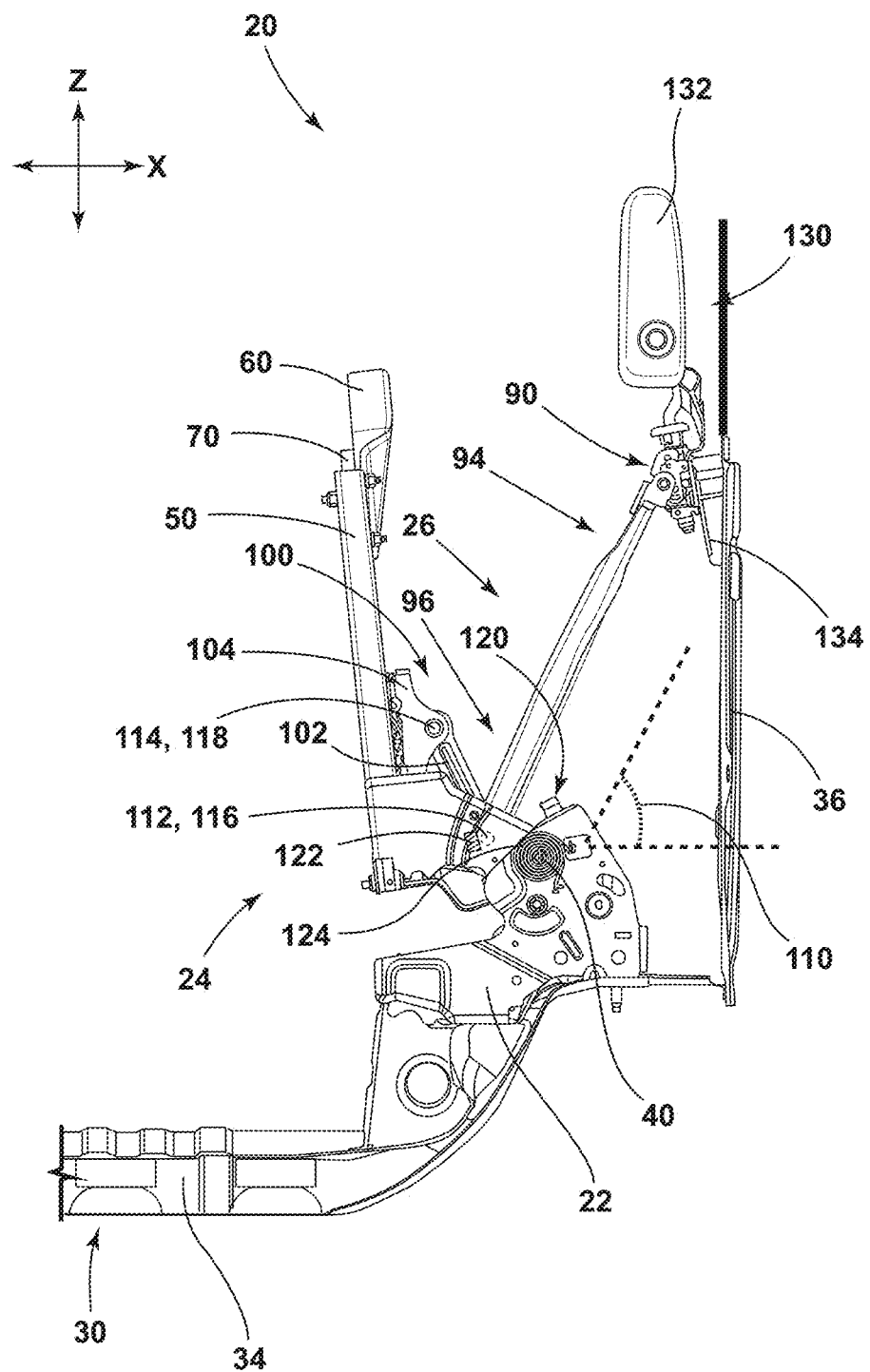

In embodiments, a seat assembly 20 may move between one or more first configurations (e.g., seating configurations), such as generally illustrated in FIGS. 1A-1C, 2A, 2B, 3A, and 3C, one or more intermediate configurations, such as generally illustrated in FIGS. 4A and 4B, and/or a third configuration (e.g., a storage configuration), such as generally illustrated in FIGS. 5A and 5B. The one or more intermediate configurations may be between the seating configurations and the storage configuration.

With embodiments, a seat support 22 may be connected (e.g., fixed) to the mounting surface 30, such as to the first mounting portion 34. The seat base frame 24 may be connected (e.g., rotationally connected) to the seat support 22 such that the seat base frame 24 may rotate relative to the seat support 22 and/or the mounting surface 30, such as about a base frame rotational axis 40 that may be substantially parallel with a transverse/lateral direction of the seat assembly (e.g., a Y-direction).

In embodiments, such as generally illustrated in FIG. 1A, a seat base frame 24 may include a first leg 50, a second leg 52, a cross member 54, a first track 56, a second track 58, a cushion pan 60, and/or a wire mat 62. The legs 50, 52 may be disposed opposite each other, may extend generally in a forward direction (e.g., in an X-direction or at angle thereto, such as about 30 degrees or less) of the seat assembly 20 when the seat assembly 20 is in a first configuration, and/or may extend in a generally upward in vertical direction (e.g., in a Z-direction) when the seat assembly 20 is in a third configuration. The legs 50, 52 may, for example and without limitation, include L-shaped configurations (e.g., if viewed along the length of the leg).

In embodiments, a first track 56 may be connected to the first leg 50. The first track 56 may include a first track portion 70 and/or a second track portion 72. The first track portion 70 may be connected (e.g., fixed) to the first leg 50. The second track portion 72 may be slidably connected with the first track portion 70 such that the second track portion 72 may slide relative to the first track portion 70, the first leg 50, the seat support 22, and/or the mounting surface 30.

With embodiments, a second track 58 may be connected to the second leg 52. The second track 58 may include a first track portion 74 and/or a second track portion 76. The first track portion 74 may be connected (e.g., fixed) to the second leg 52. The second track portion 76 may be slidably connected with the first track portion 74 such that the second track portion 76 may slide relative to the first track portion 74, the second leg 52, the seat support 22, and/or the mounting surface 30.

In embodiments, sliding movement of a second track portion 72, 76 may be conducted manually and/or automatically (e.g., via a motor/actuator 80). A non-limiting example of a manual configuration is generally described in U.S. Pat. No. 9,340,125, which is hereby incorporated by reference in its entirety. A non-limiting example of an automatic/motorized configuration is generally described in U.S. Pat. No. 5,762,309, which is hereby incorporated by reference in its entirety. With some embodiments, a motor 80 may, for example, be connected to the cross member 54 to control sliding movement of a second track portion 72 of the first track 56 and/or of a second track portion 76 of the second track 58. A cross member 54 and/or a cushion pan 60 may be connected to the second track portion 72 of the first track 56 and/or the second track portion 76 of the second track 58. For example and without limitation, the cross member 54 and the cushion pan 60 may move (e.g., slide) with the second track portions 72, 76 to a plurality of track positions. A wire mat 62 may be connected to and/or move with the cross member 54 and the cushion pan 60. The cushion pan 60 and/or the wire mat 62 may be configured to at least partially support a seat base cushion 82 on which a user/occupant may sit. The cushion pan 60 may extend beyond the front of the legs 50, 52 and/or the tracks 56, 58.

With embodiments, such as generally illustrated in FIGS. 1A and 1B, a seat base frame 24 may be connected to the seat support 22 at or about a rear of the seat base frame 24. The front end of the seat base frame 24 may be free (e.g., may not be connected to the mounting surface 30 other than via the seat support 22, which may not extend to the front of the seat base frame 24). For example and without limitation, the mounting surface 30 may not include latch for connecting the front of the seat base frame 24 to the mounting surface 30.

With embodiments, such as generally illustrated in FIGS. 1A-1D, a seatback frame 26 may be connected to a second mounting portion 36 of a mounting surface 30. For example and without limitation, the seat assembly 20 and/or the mounting surface 30 may include a hinge 90 (e.g., joint, rotating connection, pivot, etc.) that may rotationally connect the seatback frame 26 to the second mounting portion 36. The hinge 90 may be configured to facilitate adjustment (e.g., rotation) of the seatback frame 26 relative to the mounting surface 30, such as about a seatback frame rotation axis 92 that may be substantially fixed relative to the mounting surface 30 (see, e.g., FIG. 1B). For example, the hinge 90 may restrict and/or prevent substantial translation/sliding of the seatback frame 26 relative to the mounting surface 30. The seatback frame 26 may include an upper portion 94 that may be connected to and/or include at least part of the hinge 90. The upper portion 94 may include an upper cross member 94A that may be connected to and/or include at least part of the hinge 90 (see, e.g., FIG. 1A).

In embodiments, a seatback frame 26 may include a lower portion 96 that may be connected to the seat base frame 24, such as via a linkage 100. The lower portion 96 may include a lower cross member 96A. The linkage 100 may include a first lever 102, a first bracket 104, a second lever 106, and/or a second bracket 108. The first bracket 104 may be connected (e.g., fixed) to the first track 56, such as to the second track portion 72. The second bracket 108 may be connected (e.g., fixed) to the second track 58, such as to the second track portion 76. For example, the bracket(s) 104, 108 may move/slide with the second track portion(s) 72, 76. The first lever 102 may be connected (e.g., rotationally) to the seatback frame 26, such as at or about the lower portion 96, and/or may be connected (e.g., rotationally) to the first bracket 104. The second lever 106 may be connected (e.g., rotationally) to the seatback frame 26, such as at or about the lower portion 96, and/or may be connected (e.g., rotationally) to the second bracket 108.

With embodiments, a first lever first rotation axis 112 of the first lever 102 may be substantially fixed relative to the seatback frame 26 such that the first lever 102 and the seatback frame 26 can rotate relative to each other about the first lever first rotation axis 112 and may not substantially translate relative to each other. A first lever second rotation axis 114 of the first lever 102 may be substantially fixed relative to the first bracket 104 such that the first lever 102 and the first bracket 104 can rotate about the first lever second rotation axis 114 relative to each other and may not substantially translate relative to each other.

In embodiments, a second lever first rotation axis 116 of the second lever 106 may be substantially fixed relative to the seatback frame 26 such that the second lever 106 and the seatback frame 26 can rotate relative to each other about the second lever first rotation axis 116 and may not substantially translate relative to each other. A second lever second rotation axis 118 of the second lever 106 may be substantially fixed relative to the second bracket 108 such that the second lever 106 and the second bracket 108 can rotate relative to each other about second lever second rotation axis 118 and may not substantially translate relative to each other. The first lever first rotation axis 112 and the second lever first rotation axis 116 may be coaxial and/or may be substantially parallel to a Y-direction. The first lever second axis 114 and the second lever second rotation axis 118 may be coaxial and/or may be substantially parallel to a Y-direction.

With embodiments, the linkage 100 may be configured such that (i) the first rotation axes 112, 116 and the second axes 114, 118 may move relative to the seat support 22, (ii) the first rotation axes 112, 116 may move with the seatback frame 26, (iii) the second axes 114, 118 may move with the seat base frame 24, and/or (iv) a seatback frame rotation axis 92 may be substantially fixed relative to the seat support 22.

In embodiments, the axes 112, 114, 116, 118 may move if the seat assembly 20 moves. For example, in a seating configuration of the seat assembly 20 (see, e.g., FIG. 1B), the first lever first axis 112 and/or the second lever first axis 116 may be disposed at a greater height/distance from the first mounting portion 34 than the first lever second axis 114 and/or the second lever second axis 118. In a storage configuration of the seat assembly 20 (see, e.g., FIG. 5B), the first lever second axis 114 and/or the second lever second axis 118 may be disposed at/move to a greater height/distance from the first mounting portion 34 than the first lever first axis 112 and/or the second lever first axis 116.

With embodiments, movement of a second track portion 72, 76 may cause movement of the seatback frame 26 via the linkage 100. For example, as a second track portion 72, 76 moves forward, forces may be transferred from the second track portion 72, 76 to the lower portion 96 of the seatback frame 26 via the linkage 100, which may cause the seatback frame 26 to rotate via the hinge 90. During movement of a second track portion 72, 76, a lever 102, 106 may rotate relative to a bracket 104, 108 and/or the seatback frame 26. For example and without limitation, with reference to the view of the embodiment generally illustrated in FIG. 1B, as a second track portion 72, 76 moves forward (e.g., generally to the left), the seatback frame 26 may rotate clockwise, and a lever 102, 106 may rotate, at least to some degree, counterclockwise relative to the seatback frame 26 and/or relative to a corresponding bracket 104, 108 (e.g., about one or more of axes 112, 114, 116, 118).

Figure 3A:
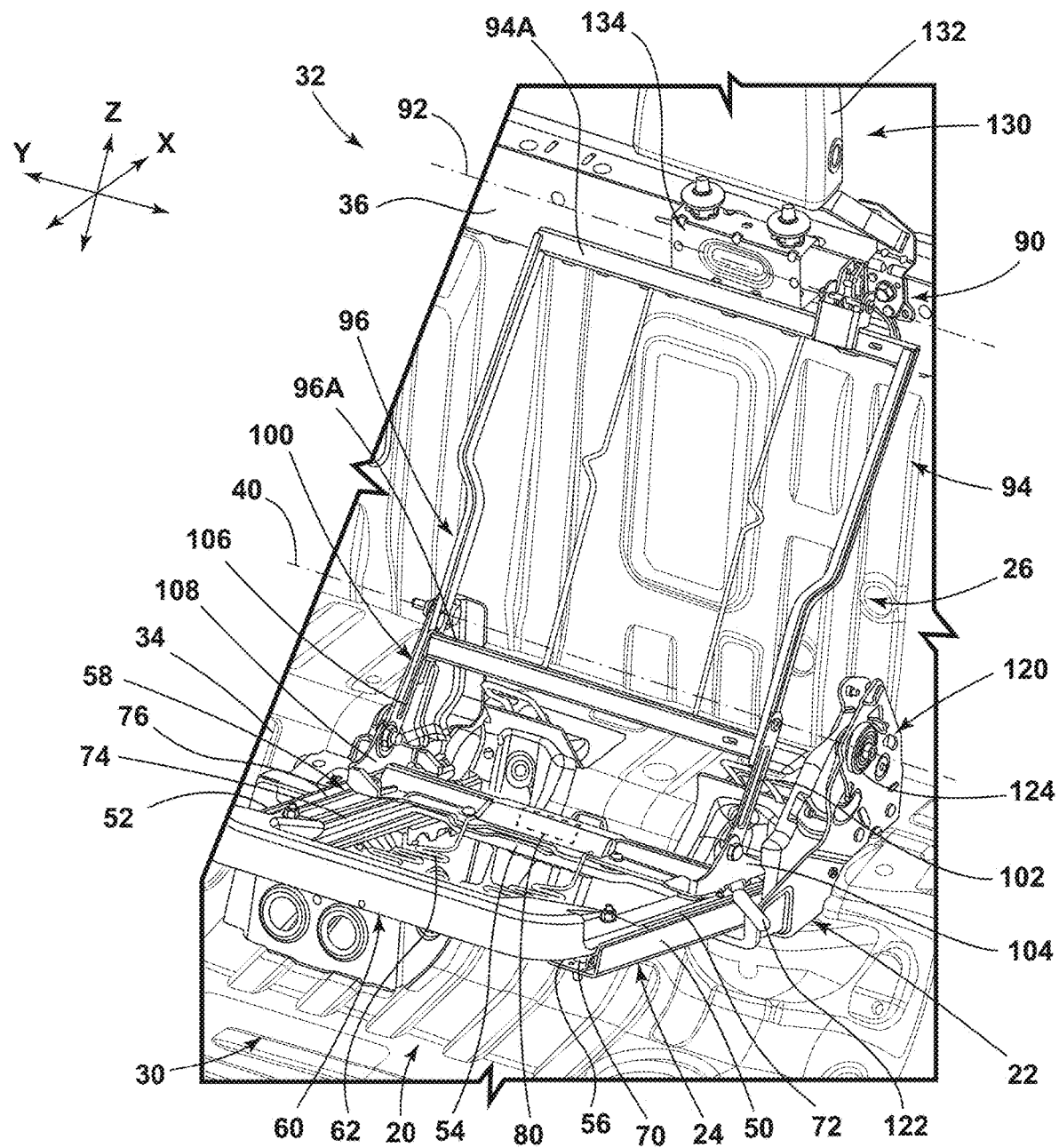
FIGS. 3A and 3B are perspective and side views, respectively, generally illustrating an embodiment of a seat assembly in a third seating configuration.
Figure 3B:
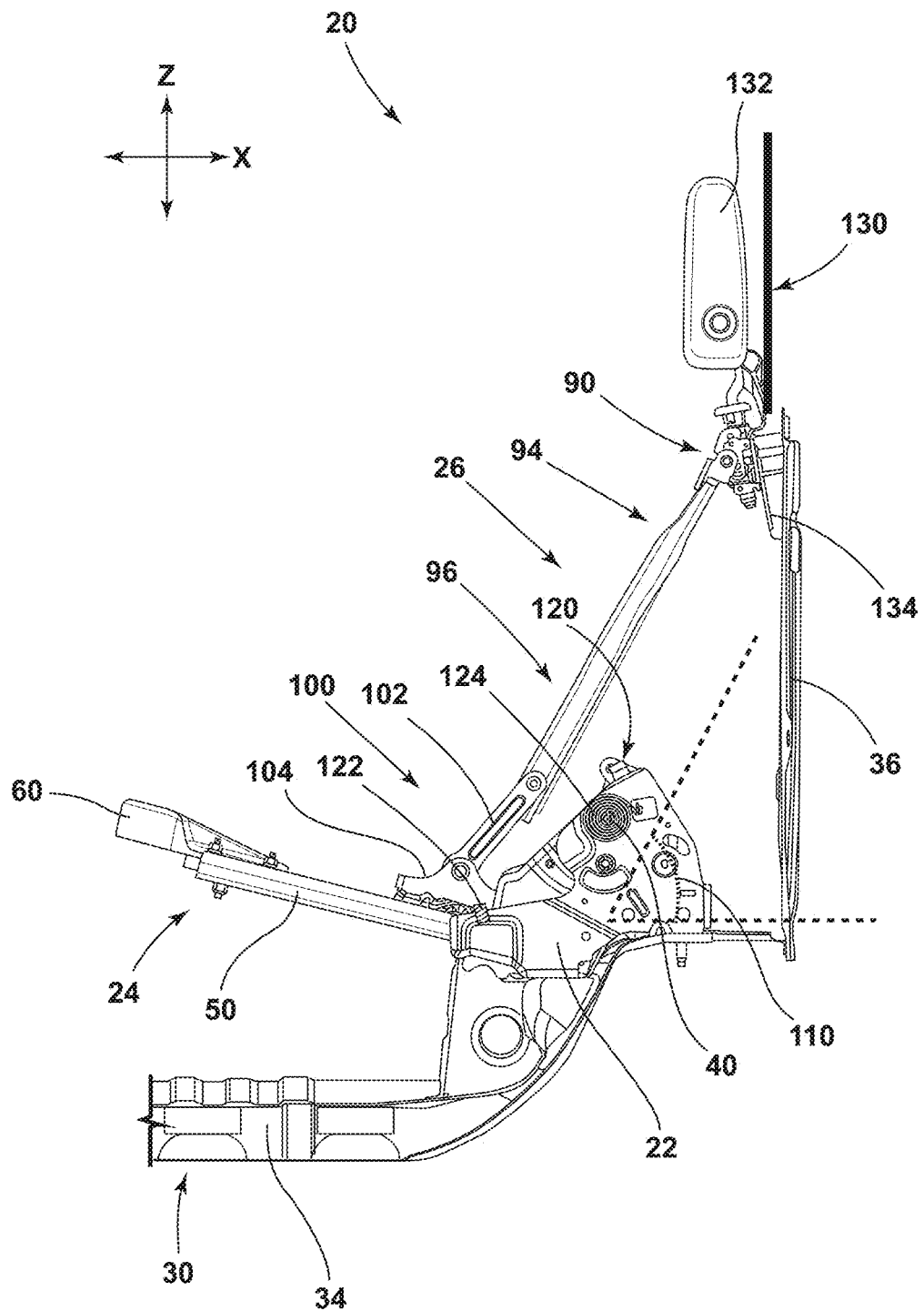

In embodiments, rotation of the seatback frame 26, which may be controlled at least partially via the tracks 56, 58, may adjust the angle 110 of the seatback frame 26, which may correspond to a seating/comfort angle for an occupant. For example, a user may adjust the seatback frame 26 between a first angle that may be relatively upright (see e.g., FIGS. 1A-1C), one or a plurality of second/intermediate angles that may be less upright/more relaxed (see, e.g., FIGS. 2A and 2B), and/or a third angle that may be the least upright/most relaxed (see, e.g., FIGS. 3A and 3B). The seat assembly 20 may, for example, be referred to as a slouching seat, and/or the angles of the seatback frame 26 may be referred to as slouching angles. A difference between the first angle and the third angle may, for example and without limitation, be about 15 degrees, or more or less. The second track portions 72, 76 of the track 56, 58 may be moved to/disposed in a first/retracted track position to set the seatback frame 26 at the first angle. The second track portions 72, 76 may be moved to/disposed in a plurality of intermediate track positions to set the seatback frame 26 at second/intermediate angles. The second track portions 72, 76 may be moved to/disposed in a third/extended position to set the seatback frame 26 at the third angle.

In embodiments, a seat assembly 20 may be configured to move between a seating configuration (see, e.g., FIGS. 1A-3B) and a storage configuration (see, e.g., FIGS. 5A and 5B). The seat assembly 20 may include a seat base frame adjuster 120 that may be configured to control movement of the seat base frame 24 between the seating configuration and the storage configuration. The seat base frame adjuster 120 may include a lock or detent 122 and/or a biasing member 124. The lock 122 (e.g., a pin, lever, cam, etc.) may selectively restrict and/or prevent rotation of the seat base frame 24. The biasing member 124 (e.g., a spring, a spiral strip spring, etc.) may be configured to bias the seat base frame 24 toward the storage position such that when the lock 122 is disengaged, the seat base frame 24 may move, on its own and/or with user assistance, toward the storage configuration.

With embodiments, a linkage 100 may be configured to facilitate and/or allow the seat assembly 20 to be moved (e.g., flipped up) into the storage configuration in a plurality of track positions of the second track portions 72, 76 and/or angles of the seatback frame 26. For example, the linkage 100 may permit the seat base frame 24 to be rotated upward when second track portions 72, 76 and the seatback frame 26 are (i) in a first/retracted track position and at a first angle, respectively, (ii) in one or more second/intermediate positions and at one or more second angles, respectively, and (iii) in a third/extended track position and at a third angle, respectively. The seat assembly 20 may, for example, be configured to be moved to a storage configuration without first moving the seatback frame 26 to a particular position (e.g., an initial position) and/or without the a second track portion 72, 76 moving relative to a first track portion 70, 74. The linkage 100 may, for example and without limitation, be configured as a lost motion linkage.

In embodiments, a seat assembly 20 may include a headrest 132. The headrest 132 may be connected to the second mounting portion 36 of the mounting surface 30. For example and without limitation, a headrest bracket 134 may be connected (e.g., fixed) to the second mounting portion 36, such as proximate and/or below a glass portion 130 of the second mounting portion 36. The headrest 132 may be selectively connected to the headrest bracket 134. The headrest 132 may not be directly connected to the seatback frame 26, the seat base frame 24, and/or the seat support 22. For example, the headrest 132 may not move with seatback frame 26 and/or the seat base frame 24.

Figure 6:
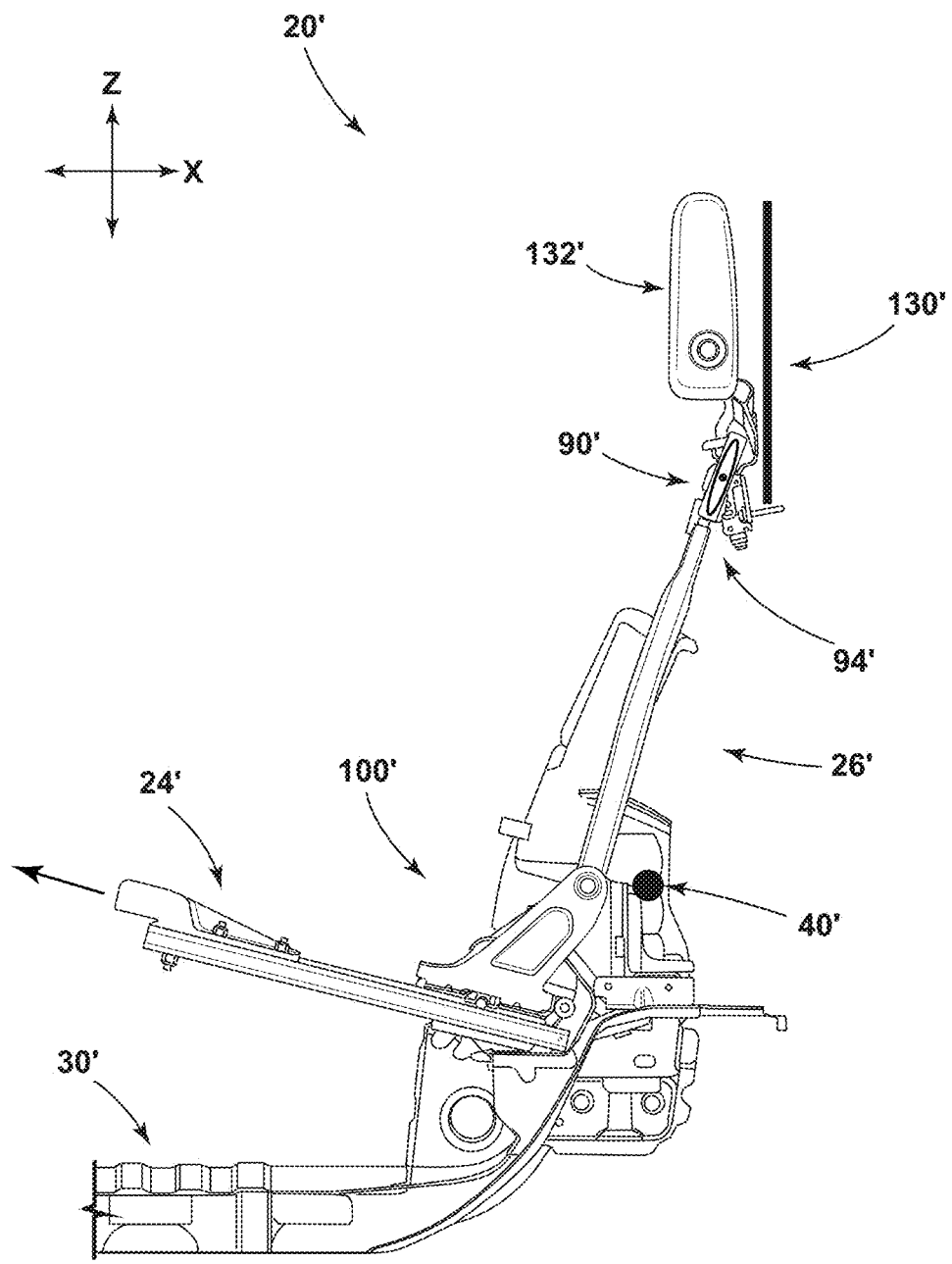
FIG. 6 is a side view generally illustrating an embodiment of a seat assembly.

With embodiments, as the second track portions 72, 76 move along first track portions 70, 74, the seatback frame 26 may rotate, such as via a hinge 90, and may not translate to a substantial degree. Additionally or alternatively, if a seat assembly 20 moves between a seating configuration and a storage configuration, the seatback frame 26 may rotate, such as via a hinge 90, and may not translate to a substantial degree. Limiting or preventing translation of the seatback frame 26 may facilitate avoiding contact between the seatback frame 26 and the second mounting portion 36, which, in some circumstances, may include a glass portion 130 (e.g., a rear window), and it may be desirable to avoid such contact to prevent damage to or breaking of the glass portion 130. For example, with other embodiments, such as the seat assembly 20' generally illustrated in FIG. 6, an upper portion 94' of the seatback frame 26' may be connected to a mounting surface 30' via a relatively long sliding connection 90', the seat base frame 24' may be connected to the mounting surface 30' for rotation about an axis 40' that may be offset from the sliding connection 90', and the seatback frame 26' may be rotationally connected with the seat base frame 24' via a one-piece bracket 100' that may be fixed to the seat base frame 24'. In some circumstances, such as if a headrest 132' is connected to the seatback frame 26', the sliding connection 90' and/or the upper portion 94' may rotate and/or slide into contact with a glass portion 130' during sliding movement of the seatback frame 26', which may damage or break the glass portion 130'.

In embodiments, as a seat assembly 20 moves between seating and storage configurations, the seatback frame 26 may not substantially rotate (e.g., if the second track portions 72, 76 are in a first/retracted position), and/or may rotate in at least one direction. For example and without limitation, if a seat assembly 20 moves from a seating configuration in which the second track portions 72, 76 are in or proximate an extended position, the seatback frame 26 may initially rotate inward (e.g., toward the second mounting portion 36) and then may rotate, at least to some degree, outward (e.g., away from the second mounting portion 36) as the seat assembly 20 approaches the storage position.

Figure 7:
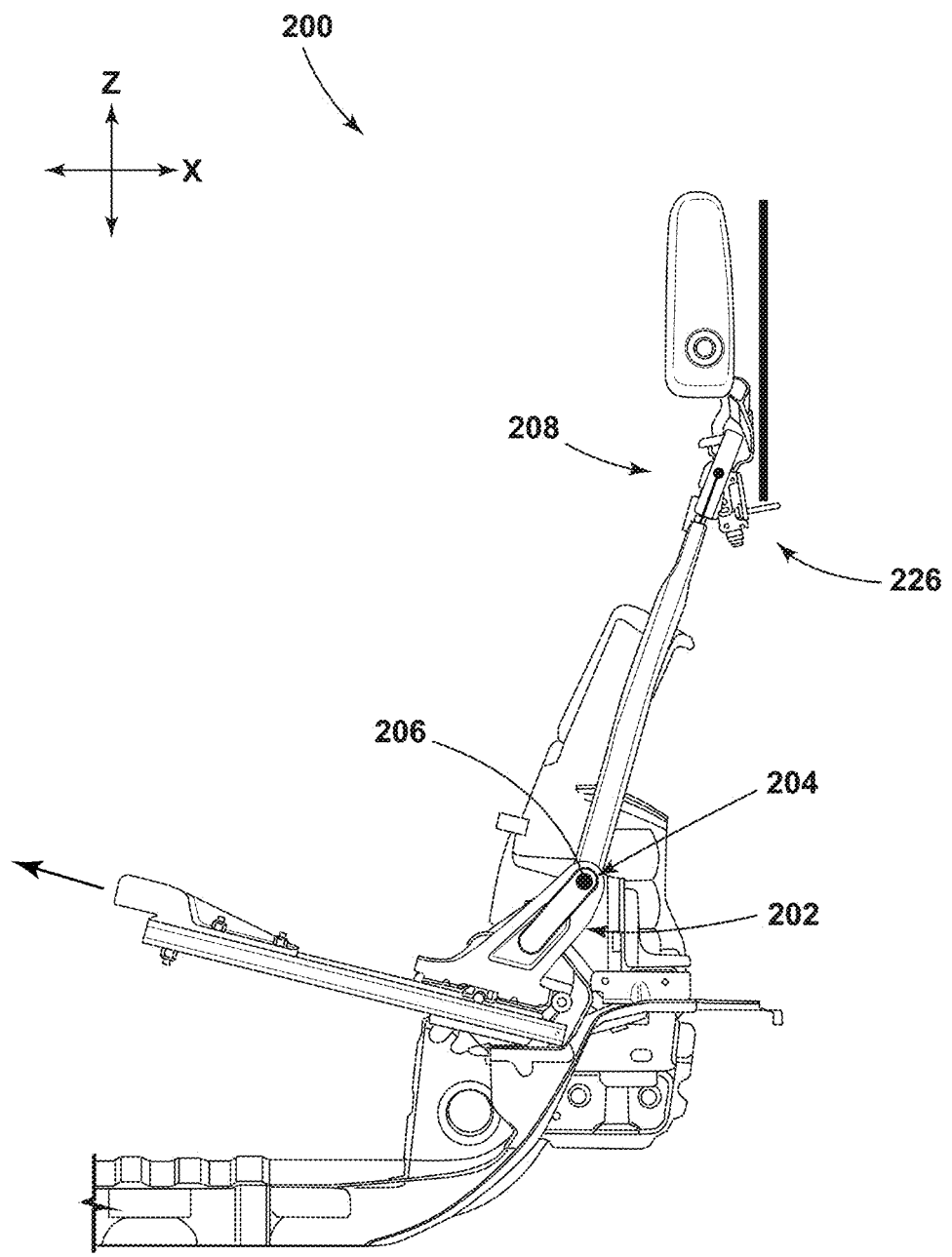
FIG. 7 is a side view generally illustrating an embodiment of a seat assembly.

In embodiments, a linkage 100 connecting a seat base frame 24 with a seatback frame 26 may not include a sliding connection (e.g., may include a rotational connection that does not permit substantial sliding/translation), and/or the seatback frame 26 may be connected to the mounting surface 30 without a sliding connection (e.g., may include a rotational connection that does not permit substantial sliding/translation), which may facilitate avoiding jamming of a pin/bolt in a slot. With some other embodiments, such as the seat assembly 200 generally illustrated in FIG. 7, a connecting member 202 may include a slot 204, and a pin 206 of the seatback frame 26' may be disposed in the slot 204. The top of seatback frame 226 may be rotationally fixed via a fixed pivot 208. In some circumstances, as the seatback frame 226 rotates, the pin 206 may become jammed in the slot 204, such as due, at least in part, to the rigidity of the seatback frame 226. A linkage 100, which may not be configured for sliding movement, may have a lower potential of jamming.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A seat assembly, comprising:
   a seat support configured to be connected to a first mounting portion of a mounting surface;
   a seatback frame having an upper portion and a lower portion;
   a seat base including:
   a seat base frame rotationally connected to the seat support, and
   a track movably connected to the seat base frame; and
   a linkage connecting the lower portion of the seatback frame with the track;
   wherein the upper portion of the seatback frame is configured to be rotationally connected to a second mounting portion of said mounting surface.

2. The seat assembly of claim 1, wherein a seatback frame rotation axis of the seatback frame is fixed.

3. The seat assembly of claim 1, wherein the linkage includes:
   a bracket connected to the track; and
   a lever rotationally connected to the bracket and rotationally connected to the lower portion of the seatback frame.

4. The seat assembly of claim 3, wherein a first lever rotation axis of the lever is substantially fixed relative to the seatback frame such that the lever and the seatback frame can rotate relative to each other and do not substantially translate relative to each other.

5. The seat assembly of claim 4, wherein a second lever rotation axis of the lever is substantially fixed relative to the bracket such that the lever and the bracket can rotate relative to each other and do not substantially translate relative to each other.

6. The seat assembly of claim 5, wherein the linkage is configured such that the first lever rotation axis and the second lever rotation axis move relative to the seat support; and
a seatback frame rotation axis is substantially fixed relative to the seat support.

7. The seat assembly of claim 3, wherein the track includes a first track portion connected to the seat base frame and includes a second track portion slidably connected to the first track portion; and
the bracket is connected to the second track portion.

8. The seat assembly of claim 7, wherein the second track portion is configured to slide relative to the first track portion and the seat base frame to facilitate adjustment of the seatback frame.

9. The seat assembly of claim 8, wherein the second track portion is configured to slide to a plurality of track positions relative to the first track portion;
the plurality of track positions correspond to angles of the seatback frame; and
the seat base frame is configured to rotate from a seating position to a storage position when the second track portion is in the plurality of track positions.

10. The seat assembly of claim 8, wherein the bracket is fixed to the second track portion such that sliding movement of the second track portion causes rotation of the seatback frame about a seatback frame rotation axis that is substantially fixed proximate the upper portion of the seatback frame.

11. The seat assembly of claim 1, wherein the seat base frame is configured to rotate relative to the seat support between a seating position and a storage position.

12. The seat assembly of claim 11, wherein, in the storage position, the seat base frame is substantially vertical.

13. A vehicle, comprising:
said mounting surface; and
the seat assembly of claim 1;
wherein the seat support is substantially fixed to the first mounting portion; and
the upper portion of the seatback frame is rotationally connected to the second mounting portion.

14. The vehicle of claim 13, wherein the seat assembly includes a headrest fixed to the second mounting portion proximate the upper portion of the seatback frame.

15. The vehicle of claim 14, wherein the second mounting portion includes a glass portion at least partially aligned with the headrest; and
the upper portion of the seatback frame is rotationally connected to the second mounting portion such that (i) a seatback frame rotation axis is substantially fixed relative to the mounting surface, (ii) the seatback frame cannot substantially translate relative to the mounting surface, and (iii) rotation of the seatback frame does not damage the glass portion.

16. The vehicle of claim 13, wherein the first mounting portion is substantially perpendicular to the second mounting portion.

17. The vehicle of claim 16, wherein the first mounting portion includes a floor of the vehicle; and
the second mounting portion includes a substantially vertical wall of the vehicle.

18. The vehicle of claim 13, wherein
the linkage includes:
a bracket connected to the track; and
a lever rotationally connected to the bracket and rotationally connected to the lower portion of the seatback frame;
a first lever rotation axis of the lever is substantially fixed relative to the seatback frame such that the lever and the seatback frame can rotate relative to each other and do not substantially translate relative to each other;
a second lever rotation axis of the lever is substantially fixed relative to the bracket such that the lever and the bracket can rotate relative to each other and do not substantially translate relative to each other;
the linkage is configured such that the first lever rotation axis and the second lever rotation axis move relative to the seat support;
a seatback frame rotation axis is substantially fixed relative to the seat support;
the track includes a first track portion connected to the seat base frame and includes a second track portion slidably connected to the first track portion;
the bracket is connected to the second track portion;
second track portion is configured to slide relative to the first track portion and the seat base frame to facilitate adjustment of the seatback frame;
the second track portion is configured to slide to a plurality of track positions relative to the first track portion;
the plurality of track positions correspond to angles of the seatback frame; and
the seat base frame is configured to move from a seating position to a storage position when the second track portion is in the plurality of track positions.

19. The vehicle of claim 18, wherein the seat base frame is configured to move from the seating position to the storage position when the second track portion is in the plurality of track positions without the second track portion moving relative to the first track portion.

20. The vehicle of claim 18, including a headrest connected to the second mounting portion such that the headrest does not move with the seatback frame.

* * * * *